(12) United States Patent
Klapperich

(10) Patent No.: US 6,536,125 B2
(45) Date of Patent: Mar. 25, 2003

(54) MEASURING AND SHIFTING SQUARE

(76) Inventor: Leo Klapperich, Im Kühstiefel 21, 56653 Wehr (DE)

(*) Notice: Subject to any disclaimer, the term of this patent is extended or adjusted under 35 U.S.C. 154(b) by 0 days.

(21) Appl. No.: 09/788,291

(22) Filed: Feb. 16, 2001

(65) Prior Publication Data

US 2001/0022032 A1 Sep. 20, 2001

(30) Foreign Application Priority Data

Feb. 18, 2000 (DE) .......................... 100 07 447
Jan. 17, 2001 (DE) .................... 201 00 809 U

(51) Int. Cl.$^7$ ................................................ B43L 7/10
(52) U.S. Cl. ........................... 33/471; 33/472; 33/419; 33/464
(58) Field of Search ......................... 33/41.1, 42, 333, 33/334, 418, 419, 424–430, 437, 451, 452, 456, 459, 460, 464, 465, 468–473, 495–500

(56) References Cited

U.S. PATENT DOCUMENTS

| 345,196 | A | * | 7/1886 | Vose | 33/43 |
|---|---|---|---|---|---|
| 640,270 | A | * | 1/1900 | Carmical | 33/419 |
| 703,235 | A | * | 6/1902 | Camden | 33/473 |
| 842,585 | A | * | 1/1907 | Ross | 33/469 |
| 858,913 | A | * | 7/1907 | Sauer | 33/456 |
| 984,347 | A | * | 2/1911 | Cardell | 33/26 |
| 1,045,695 | A | * | 11/1912 | Goldwater | 33/468 |
| 1,160,920 | A | * | 11/1915 | Lucas | 33/451 |
| 1,346,409 | A | * | 7/1920 | Lucas | 33/473 |
| 1,501,588 | A | * | 7/1924 | Ellison | 33/456 |
| 1,623,117 | A | * | 4/1927 | Holland | 33/464 |
| 1,638,200 | A | * | 8/1927 | Hester | 33/499 |
| 1,983,516 | A | * | 12/1934 | Ahola | 33/419 |
| 2,101,365 | A | * | 12/1937 | Erickson | 33/424 |
| 2,197,505 | A | * | 4/1940 | Mosher | 33/666 |
| 2,656,609 | A | * | 10/1953 | Siggson | 33/452 |
| 2,667,190 | A | * | 1/1954 | Delano | 33/427 |
| 2,775,037 | A | * | 12/1956 | Baumunk | 33/499 |
| 2,823,709 | A | * | 2/1958 | Konieczka | 83/745 |
| 2,830,378 | A | * | 4/1958 | Givan | 33/679 |
| 2,853,784 | A | * | 9/1958 | Morgan | 33/473 |
| 2,893,126 | A | * | 7/1959 | Coallier | 33/473 |
| 3,243,883 | A | * | 4/1966 | Morgan et al. | 33/464 |
| 3,866,326 | A | * | 2/1975 | Hebel et al. | 33/438 |
| 4,348,815 | A | * | 9/1982 | Hurt | 33/419 |
| 4,446,627 | A | * | 5/1984 | Persson | 33/497 |
| 4,599,805 | A | * | 7/1986 | Padilla | 33/464 |
| 4,599,806 | A | * | 7/1986 | Wright | 33/469 |
| 4,903,409 | A | * | 2/1990 | Kaplan et al. | 30/293 |
| 4,956,919 | A | * | 9/1990 | Granger | 33/32.2 |
| 5,035,061 | A | * | 7/1991 | Bradbury et al. | 33/430 |
| 5,461,794 | A | * | 10/1995 | Huang | 33/470 |
| 5,617,642 | A | * | 4/1997 | Marios | 33/526 |
| 5,832,618 | A | * | 11/1998 | Scarborough | 33/451 |
| 5,915,807 | A | * | 6/1999 | Ilagan | 33/471 |
| 6,260,283 | B1 | * | 7/2001 | Abernathy et al. | 33/419 |

* cited by examiner

Primary Examiner—Diego Gutierrez
Assistant Examiner—R. Alexander Smith
(74) Attorney, Agent, or Firm—Friedrich Kueffner

(57) ABSTRACT

A device for generating angles has a ruler-shaped basic rail having a first guide extending in a longitudinal direction of the basic rail. A stop rail is arranged in the first guide of the basic rail and is rotatable and slidable into different positions relative to the basic rail and securable in the different positions. The stop rail has an underside provided with depressions positioned at an acute angle to one another and forming a star-shaped arrangement. The basic rail has a projection that engages the depressions.

16 Claims, 2 Drawing Sheets

MEASURING AND SHIFTING SQUARE

BACKGROUND OF THE INVENTION

1. Field of the Invention

The invention relates to a device for generating angles, comprised of a ruler-like basic rail and a stop rail arranged thereon so as to be rotatable and securable in different positions.

2. Description of the Related Art

A device called a measuring and shifting square is known which is comprised of a basic rail of aluminum on which a ruler-like measuring scale is provided. At a spacing from one end of the basic rail, a screw is arranged stationarily on which a stop rail can be rotated and secured by means of a nut. The stop rail can be positioned in different angular positions relative to the basic rail. Such a device has the disadvantage that it is not possible to measure within a corner or to change the initial position of the stop rail on the basic rail. Moreover, the aforementioned device does not allow for a left-sided or right-sided use. The application range of such a device is thus limited.

SUMMARY OF THE INVENTION

It is an object of the present invention to improve a device for generating angles such that the initial position of the stop rail relative to the basic rail can be changed over the entire length of the basic rail and that the device can be used also in corners. In addition, it is to be provided that also other measuring and tracing or marking work can be performed with such a device.

In accordance with the present invention, this is achieved in that the basic rail has a guide extending in the longitudinal direction for slidably receiving a stop rail and that the underside of the stop rail is provided with depressions, positioned at an acute angle relative to one another and forming a star-shaped arrangement, for receiving a projection provided on the basic rail.

With this configuration, the initial position of the stop rail can be moved over the entire length of the basic rail and can thus be freely selected. Accordingly, it is possible to use this device also in corners. The projection or its configuration, in connection with the star-shaped depressions at the underside of the stop rail, makes it possible that the stop rail can be adjusted and secured over the entire length of the basic rail in 15° steps. The device according to the invention can be used left-sided as well as right-sided and can thus be handled by left-handed and right-handed people. The device can be used as a flat square as well as a shifting square, wherein the basic rail as well as the stop rail can be used as guide means for tools. The device can be used for measuring, tracing, and cutting.

DESCRIPTION OF THE PREFERRED EMBODIMENTS

Figure 1:
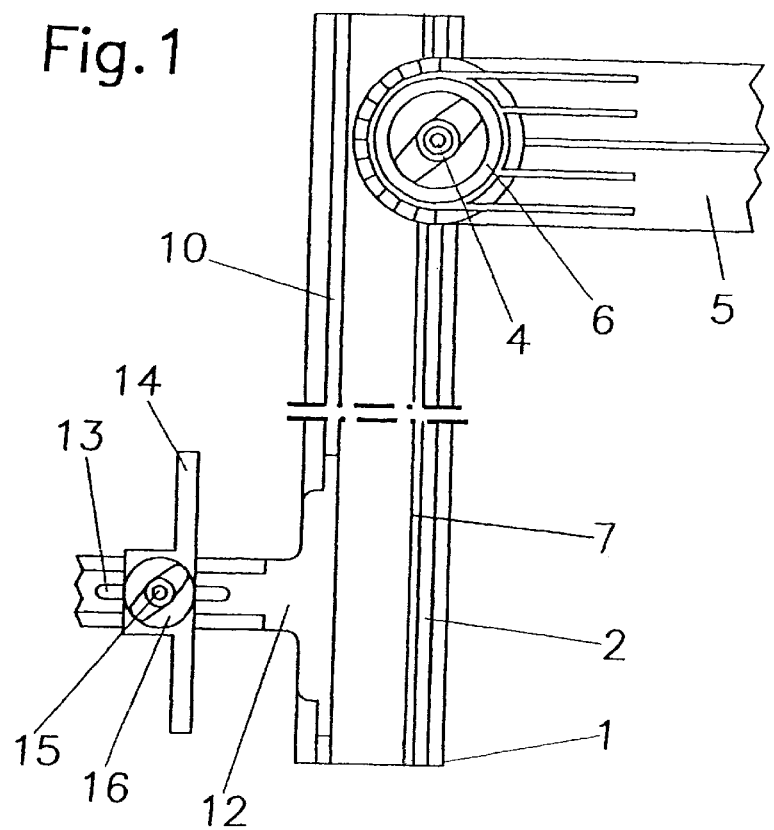
FIG. 1 is a plan view of the device according to the invention.
Figure 2:
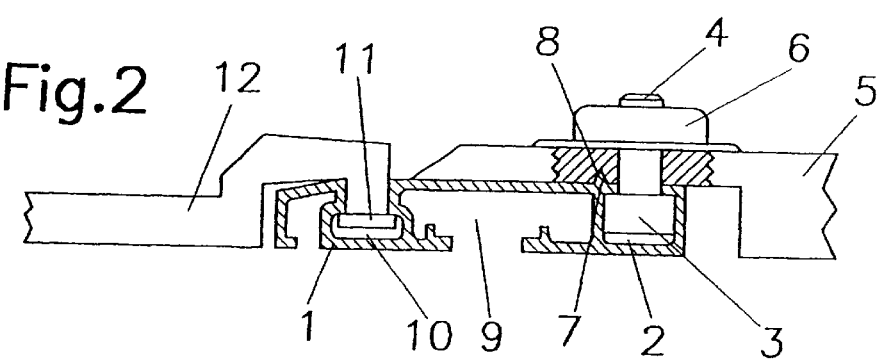
FIG. 2 is a sectional view of the basic rail of FIG. 1 in the area of the stop rail.

FIGS. 1 and 2 of the drawing show a device for generating angles. This device can be used as a flat square as well as a shifting square. It is used for measuring, marking, tracing, cutting, sawing or milling.

This device is comprised of a basic rail 1, for example, made of aluminum, which has at its upper side, at least on the edge, a measuring scale of mm markings. Such a scale or graduation is known in the art but not represented here. The basic rail 1 has a cross-section as illustrated in FIG. 2 and can be continuously manufactured by extrusion and then cut to the desired length. In the illustrated embodiment, the basic rail 1 has at its upper side, shown in FIG. 1, a first guide which is embodied as an undercut groove 2 which advantageously has a T-shaped cross-section. The head 3 of a screw 4 is inserted into this groove 2 and projects upwardly. A stop rail 5 is placed onto the screw 4. The stop rail 5 is formed of sheet metal or plastic material and is secured by means of a nut 6 on the basic rail 1. By sliding the screw 4 in the guide groove 2, the stop rail 5 can be moved into any desired initial position along the length of the basic rail 1.

The basic rail 1 is provided at the upper side of the groove 2 with a rib 7 extending in the longitudinal direction of the basic rail. The cross-section is substantially selectable as desired but is advantageously triangular. The stop rail 5 has several depressions 8 which are positioned, for example, at an acute angle of 15° to one another so as to provide a star-shaped arrangement. The depressions 8 are groove-shaped and correspond to the cross-section of the rib 7. In this way, it is possible to adjust the stop rail 5 variably in 15° steps relative to the basic rail 1 and to secure it thereon. In this embodiment, the underside of the basic rail 1 has a further guide groove 9 into which the head of a clamping device known in the art, for example, in the form of a cramp, can be inserted (FIG. 2). This guide groove 9 is also undercut and can receive a T-shaped head. By means of the clamping device the basic rail 1 can thus be clamped onto a table or a workbench or onto a workpiece.

Finally, the basic rail 1 has at its upper side a further guide 10 which in this embodiment is also in the form of a guide groove and also has a T-shaped cross-section. This guide 10 can also be provided at the underside or the lateral surface of the basic rail 1. The embodiment of the guide 10 as an undercut rib is also possible. A guide part 11 of a strip 12 can be inserted into this guide 10 in a guiding fashion. The actual guiding action of the strip 12 in the guide 10 is realized by lateral upper boundary surfaces of the guide 10 which is formed as a guide groove. The strip 12 normally is always positioned at a right angle relative to the basic rail 1. The guide strip 12 in the illustrated embodiment is provided with at least one slotted hole 13 in which a stop 14 is slidably arranged. The stop 14 can be clamped onto the strip 12 by means of a screw 15 with nut 16. This embodiment of the device makes it possible that between the basic rail 1 and the stop 14 a saw can be secured and guided very precisely by moving the strip 12. The risk that the saw blade of the saw can deform outwardly is normally no longer present.

Figure 3:
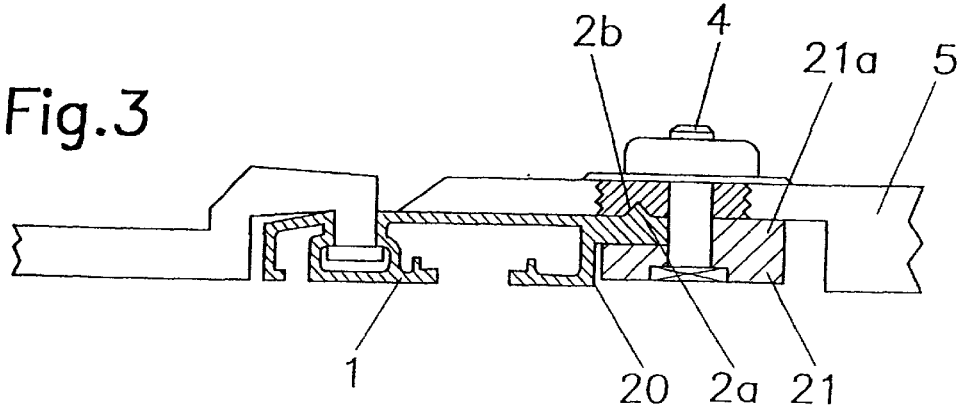
FIG. 3 is another cross-sectional view of the basic rail according to the invention.

In the embodiment according to FIG. 3, the basic rail 1 has no guide formed as a groove 2. The guide is provided here in the form of a longitudinally extending rib 2a on the upper side of the basic rail 1. The stop rail 5 then has a groove 2b with a cross-section corresponding to that of the rib 2a. On its underside, the basic rail 1 has a cutout 20 extending in the longitudinal direction in which a clamping piece 21 is slidably arranged. The clamping piece 21 has a right angle cross-section and is positioned on the one hand with its leg 21a at the underside of the stop rail 5. The other leg 21b of the clamping piece 21 rests with its inner surface against the lower surface of the cutout 20. This contact is achieved by a securing screw 4 whose head 3 is secured against rotation within the clamping piece 21.

Figure 4:
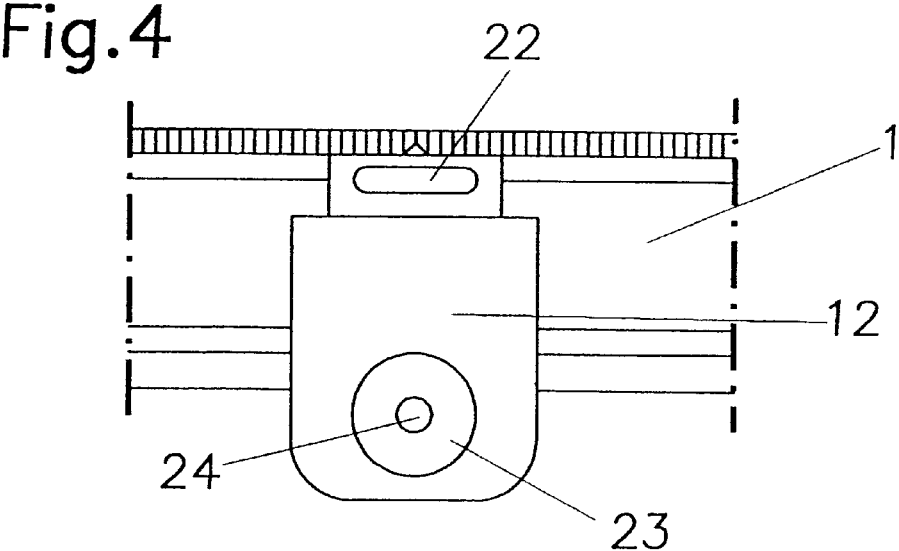
FIG. 4 is a plan view of a basic rail with a bubble level and a drill guide.
Figure 5:
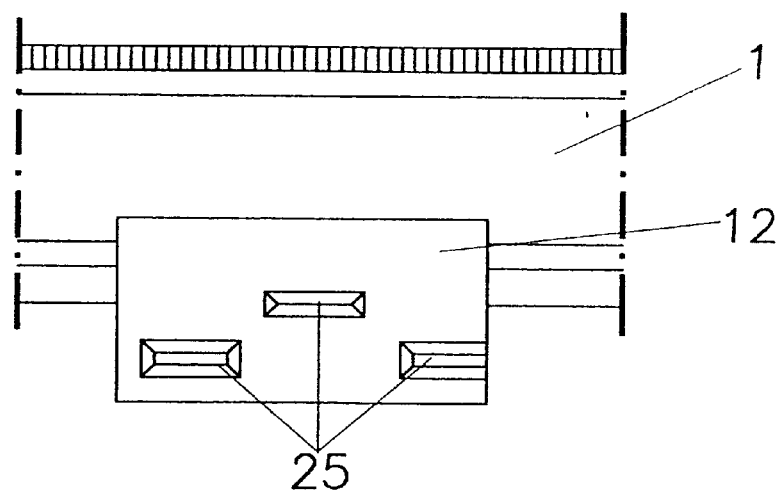
FIG. 5 is a plan view of a basic rail with a guide for a drawing knife.

In the embodiments illustrated in FIGS. 4 and 5 only one detail of the basic rail 1 is illustrated, respectively. According to FIG. 4, a strip 12 is slidably inserted into the basic rail 1 which, on the one hand, has a bubble level 22 and, on the other hand, a drill guide or hole gauge 23 for a drill. The drill guide 23 is connected, for example, in an exchangeable fashion by a snap connection. By means of the bubble level 22 it is possible to keep the basic rail 1, for example, in a precisely horizontally aligned position. When the bubble level 22 is arranged differently, a vertical position of the basic rail is possible. In this connection, it is also possible to provide two bubble levels 22 wherein one of them is suitable for horizontal positioning and the other for vertical positioning of the basic rail 1. If needed, the bubble level 22 can also be arranged in an adjustable fashion on the strip 12 so that the basic rail 1 can be aligned in a predetermined angular position. By means of clamping members, not illustrated, the strip 12 can be fixedly connected to the basic rail 1.

The drill guide 23 can be secured exchangeably on the strip 12. It has a bore 24 which corresponds to the diameter of the employed drill bit so that very precisely aligned bores can be drilled into the workpiece. By means of the measuring scale mentioned above and illustrated here on the basic rail 1, it is possible to provide a very precise spacing between two bores. Conventional drill guides (hole gauges) 23 can be used.

In FIG. 5, the strip 12 is designed differently and has, for example, three slots 25 into which, as needed, a drawing knife for a cutting process can be inserted and guided very precisely. The drawing knife can be positioned directly on the basic rail 1 or at a spacing therefrom. The slot 25, positioned to the right in the drawing and open to the exterior, makes it possible to cut also in corners. The strip 12 with its slots 25 provides protection against injury.

Figure 6:
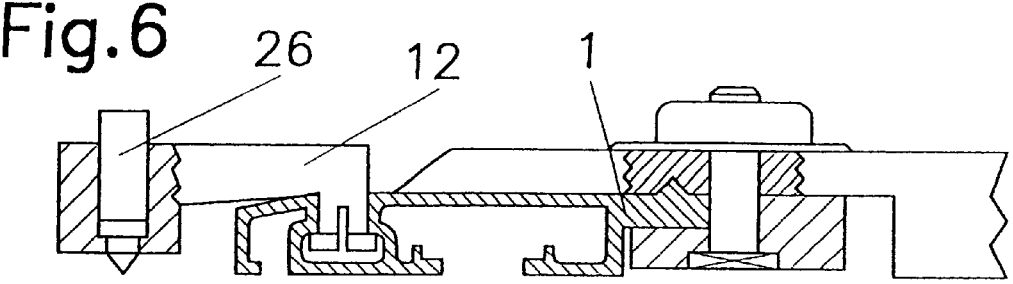
FIG. 6 is a section view corresponding to FIG. 2 showing a prick punch.

FIG. 6 of the drawing shows the basic rail 1 in a view corresponding to that of FIG. 3. A movable strip 12 is being used which is provided with a prick punch 26. This prick punch 26 is advantageously clamped onto the strip 12 and makes it possible to mark drilling surfaces, for example, for providing a hole pattern for a later attachment of picture frames.

As a further development of the disclosed embodiments, it is possible to design the stop rail 5 of a two-part configuration, and to arrange, for example, the part provided with the scale on the basic rail 1 while the actual stop rail 5 is secured in a rotatable fashion on the part having the scale. The stop rail 5 can have a pivot which is arranged at a spacing from the screw 4. It is possible to secure the stop rail 5 on the pivot or on a different location of the part provided with the scale. Moreover, the guide groove 2 providing the guiding action for moving the stop rail 5 can also be provided at a lateral surface of the basic rail which is designed accordingly.

While specific embodiments of the invention have been shown and described in detail to illustrate the inventive principles, it will be understood that the invention may be embodied otherwise without departing from such principles.

What is claimed is:

1. A device for generating angles, the device comprising:
   a ruler-shaped basic rail having a first guide extending in a longitudinal direction of the basic rail;
   a stop rail arranged in the first guide of the basic rail and configured to be rotatable and slidable into different positions relative to the basic rail and securable in the different positions;
   wherein the stop rail has an underside provided with depressions positioned at an acute angle to one another and forming a star-shaped arrangement;
   wherein the basic rail has a projection configured to engage the depressions.

2. The device according to claim 1, wherein the first guide is a first guide groove.

3. The device according to claim 2, wherein the first guide groove is a first undercut groove and the stop rail comprises a securing screw having a screw head, wherein the screw head is received in the undercut groove.

4. The device according to claim 3, wherein the basic rail has an underside and the underside has a second undercut groove configured to receive a clamping head of a clamping device.

5. The device according to claim 4, further comprising a strip having a guide part, wherein the basic rail has a second guide configured to receive the guide part of the strip.

6. The device according to claim 5, wherein the second guide is arranged at an upper side of the basic rail and is a second guide groove.

7. The device according to claim 6, wherein the first and second undercut grooves, the second guide, the head of the securing screw, the clamping head, and the guide part have a T-shaped cross-section.

8. The device according to claim 5, wherein the strip has an adjustable stop extending parallel to the basic rail.

9. The device according to claim 5, wherein the second guide is arranged at an upper side of the basic rail and is a guide rib.

10. The device according to claim 5, wherein the strip has at least one slot configured to guide a knife.

11. The device according to claim 5, wherein the strip has a moveable prick punch.

12. The device according to claim 5, wherein the strip has at least one bubble level.

13. The device according to claim 12, wherein the at least one bubble level is adjustably mounted on the strip.

14. The device according to claim 5, wherein the strip has at least one drill guide.

15. The device according to claim 14, wherein the at least one drill guide is exchangeable attached on the strip.

16. The device according to claim 1, wherein the projection is a rib extending on the upper side of the basic rail in the longitudinal direction.

* * * * *